(12) United States Patent
Wilbert (10) Patent No.: US 9,699,959 B2
(45) Date of Patent: Jul. 11, 2017

(54) CLEANING FLAPS FOR A CENTER KNIFE DRIVE FOR A SICKLE OF A PLANT CUTTING MACHINE

(75) Inventor: Andrew R. Wilbert, Walworth, NY (US)

(73) Assignee: CNH Industrial America LLC, New Holland, PA (US)

( * ) Notice: Subject to any disclaimer, the term of this patent is extended or adjusted under 35 U.S.C. 154(b) by 409 days.

(21) Appl. No.: 14/126,086

(22) PCT Filed: Jun. 18, 2012

(86) PCT No.: PCT/US2012/042963
§ 371 (c)(1),
(2), (4) Date: Dec. 13, 2013

(87) PCT Pub. No.: WO2012/174536
PCT Pub. Date: Dec. 20, 2012

(65) Prior Publication Data
US 2014/0090346 A1     Apr. 3, 2014

Related U.S. Application Data

(60) Provisional application No. 61/520,891, filed on Jun. 16, 2011.

(51) Int. Cl.
*A01D 34/02* (2006.01)
*A01D 34/00* (2006.01)
(Continued)

(52) U.S. Cl.
CPC .......... *A01D 34/003* (2013.01); *A01D 34/04* (2013.01); *A01D 34/145* (2013.01); *A01D 34/30* (2013.01)

(58) Field of Classification Search
CPC ............................. A01D 34/30; A01D 34/003
(Continued)

(56) References Cited

U.S. PATENT DOCUMENTS 334,723 A     7/1865 Potee
1,567,013 A *  12/1925 Rutishauser ......... A01D 34/125
                                                            56/17.6
(Continued)

FOREIGN PATENT DOCUMENTS

CN     1722960 A     1/2006
CN     1795709 A     7/2006
(Continued)

OTHER PUBLICATIONS

CN201280037030, Office Action, mailed Sep. 22, 2015, 21 pages.
(Continued)

*Primary Examiner* — Thomas B Will
*Assistant Examiner* — Mai Nguyen
(74) *Attorney, Agent, or Firm* — Peter K. Zacharias; Patrick M. Sheldrake (57) ABSTRACT

A center knife drive for a sickle of a plant cutting machine having an upwardly facing cover and at least one output element reciprocatingly movable by the drive above the cover for moving a knife of the sickle in a sideward reciprocating cutting action, including at least one cleaning flap in connection with the output element positioned and configured for reciprocating forward and rearward movement thereby, disposed above the cover and configured for cleaning loose material therefrom during the movement and for pushing the loose material from the cover to accommodate upward movement of the drive within a space below or in a floor of the machine, clearing the material from the path of the output element, and improved heat dissipation.

20 Claims, 12 Drawing Sheets

(51) Int. Cl.
*A01D 34/14* (2006.01)
*A01D 34/30* (2006.01)
*A01D 34/04* (2006.01)

(58) Field of Classification Search
USPC .......................................... 56/257, 259, 261
See application file for complete search history.

(56) References Cited

U.S. PATENT DOCUMENTS

| | | | |
|---|---|---|---|
| 1,587,862 A * | 6/1926 | Rutishauser | A01D 34/02 |
| | | | 56/17.6 |
| 1,622,299 A | 3/1927 | Wanamaker | |
| 2,332,840 A | 10/1943 | Boyer | |
| 2,515,343 A | 7/1950 | Gravely | |
| 2,742,753 A | 4/1956 | Hardman | |
| 2,957,295 A * | 10/1960 | Brown | A01D 34/003 |
| | | | 56/13.4 |
| 3,396,518 A * | 8/1968 | Johnson | A01D 34/003 |
| | | | 56/16.9 |
| 3,481,547 A | 12/1969 | Andrae | |
| 3,503,271 A * | 3/1970 | Heinlein | A01D 34/30 |
| | | | 74/44 |
| 3,561,200 A | 2/1971 | Minunno | |
| 3,656,285 A | 4/1972 | Carlson | |
| 3,763,638 A * | 10/1973 | Vogelenzang | A01D 34/30 |
| | | | 56/293 |
| 3,881,305 A | 5/1975 | Burrough | |
| 4,023,334 A | 5/1977 | Heath | |
| 4,067,179 A * | 1/1978 | Schneider | A01D 34/30 |
| | | | 56/297 |
| 4,198,803 A | 4/1980 | Quick et al. | |
| 4,364,221 A * | 12/1982 | Wixom | A01D 34/685 |
| | | | 56/13.6 |
| 4,703,614 A * | 11/1987 | Cooper | A01F 29/02 |
| | | | 241/101.77 |
| 4,722,172 A | 2/1988 | Pearce | |
| 4,891,932 A | 1/1990 | Johnson | |
| 4,909,025 A | 3/1990 | Reissig et al. | |
| 7,275,358 B2 | 10/2007 | Blakeslee et al. | |
| 7,401,458 B2 | 7/2008 | Priepke | |
| 7,520,118 B1 | 4/2009 | Priepke | |
| 7,730,709 B2 | 6/2010 | Priepke | |
| 7,805,919 B2 | 10/2010 | Priepke | |
| 8,011,272 B1 | 9/2011 | Bich et al. | |
| 8,151,547 B2 | 4/2012 | Bich et al. | |
| 8,347,594 B1 * | 1/2013 | Lovett | A01D 41/14 |
| | | | 56/257 |
| 2008/0010962 A1 * | 1/2008 | Iannello | A01D 34/003 |
| | | | 56/229 |
| 2009/0260338 A1 * | 10/2009 | Benway | A01D 34/003 |
| | | | 56/202 |
| 2011/0078989 A1 | 4/2011 | Bich et al. | |

FOREIGN PATENT DOCUMENTS

| | | |
|---|---|---|
| CN | 101411263 A | 4/2009 |
| JP | S6041123 U | 3/1985 |
| RU | 2363136 C1 | 8/2009 |
| SU | 1269763 A1 | 11/1986 |

OTHER PUBLICATIONS

CN201280037030, Office Action, mailed May 31, 2016, 17 pages.
CN201280037030, Office Action, mailed Nov. 30, 2016, 7 pages.
RU2014101155, Office Action, mailed Apr. 19, 2016, 8 pages.

* cited by examiner

CLEANING FLAPS FOR A CENTER KNIFE DRIVE FOR A SICKLE OF A PLANT CUTTING MACHINE

CROSS REFERENCE TO RELATED APPLICATIONS

This application is the US National Stage for International Application No. PCT/US2012/042963, filed on Jun. 18, 2012, which itself is related to and claims the benefit of U.S. Provisional Application No. 61/520,891, filed Jun. 16, 2011.

TECHNICAL FIELD

This invention relates generally to apparatus for cleaning loose plant residue and other undesired material from a knife drive of a sickle of a plant cutting machine, and more particularly, which includes cleaning flaps connected to reciprocating output members of the drive for movement therewith in a cooperating manner to clean loose from an upper surface of the drive and reduce crop loss through openings in a floor of the machine.

BACKGROUND ART

The disclosure of U.S. Provisional Application No. 61/520,891, filed Jun. 16, 2011, is hereby incorporated herein in its entirety by reference.

Sickles typically including cutter bars supporting a row of knives, have been used to cut plants, including, but not limited to, hay, grasses, small grains and the like, for many years.

The knives are composed of a plurality of knife or sickle sections which are mounted in side by side relation forming an elongate metal knife assembly. The elongate knife assembly is normally supported so as to slide longitudinally along an elongate stationary bar that has forwardly projecting, spaced apart guards bolted to a structural beam or knife back. The knife assembly moves back and forth in a reciprocating movement to move the knives relative to the guards so that the leading knife edges of the knives cross over the guards or through slots in the guards. This produces a shearing or cutting action which severs plant stems and stalks or other material captured between the knives and the guards.

In a harvesting machine, such as a combine or windrower, the knife assembly and stationary bar are typically supported in connection with a cutting head or header, and are oriented so as to extend sidewardly along a forward edge portion of structure such as a floor or pan of the header, hereinafter sometimes referred to generally as the floor. The floor or pan defines the lower periphery of a cut crop or plant flow area, which can include conveying apparatus, such as one or more augers or belts, operable in cooperation with a reel in machines so equipped, for conveying the cut plant material and crops, for instance, to a feeder inlet of a combine or windrow forming apparatus of a windrower.

Historically, many known sickle knife or cutter drive mechanisms have been located on the side end of the sickle, and connect to the knife assemblies utilizing connecting rods or Pitman arms, such as illustrated in Wanamaker U.S. Pat. No. 1,622,299, issued Mar. 29, 1927, and Boyer U.S. Pat. No. 2,332,840, issued Oct. 26, 1943. More recent known sickle drives are located in or below the floor or pan of a header or plant cutting machine, and are sometimes referred to as center drives or center knife drives, as shown in Priepke U.S. Pat. Nos. 7,810,304; 7,805,919; 7,730,709; 7,520,118; and 7,401,458, and Bich U.S. Pat. Nos. 8,011,272 and 8,151,547. Center knife drives such as these are advantageous as they are compact, and provide an efficient manner of translating epicyclic or crank motion to side to side knife motion.

A problem observed with the above center knife drives and other center drives such as pivotally driven drives, is that because of their location in or below the floor or pan, the drives are at least partially contained in a relatively low profile or flat housing or cover, on which loose crop material or residue and other undesirable material such as dust, dirt, and debris, can collect or accumulate. This is undesirable, as the material, if allowed to accumulate, can insulate the drive to reduce dissipation of heat generated by operation of the drive so as to possibly result in overheating and premature failure of drive components such as bearings.

As another problem, accumulated material can become lodged between the drive and underside of the floor or pan, and can even be compacted into a solid mass, so as to limit or prevent upward movement of the drive. This can be problematic, for instance, if the drive is used with a cutter bar and sickle that can flex upwardly, and wherein the sickle can be configured in a float mode so as to be movable upwardly toward the floor or pan. As another possible problem, some crop can be lost through openings or apertures of the floor or pan through which knife arms or other elements connecting with the knife assemblies pass.

Reference Rutishauser U.S. Pat. No. 1,567,013, which discloses an apparatus operable for preventing accumulation of material on a lever or knife arm of a sickle drive. The Rutishauser patent accomplishes this using a triangular distributing member that is pivoted back and forth over the lever to deflect and distribute the material cut by the sickle to the sides of the lever, which are open to allow the material to fall to the ground below. This keeps the cut material from collecting on or in the immediate vicinity of the lever, but would not be effective for an application wherein a cover or enclosure of the drive extends laterally a substantially distance from the path or region of reciprocating back and forth movement of the lever or knife arm, as the deflected material would simply accumulate on the adjacent region of the cover just beyond the coverage of the lever or arm. The Rutishauser apparatus would also be relatively ineffective for preventing crop loss through openings of a floor or pan through which a knife arm or lever extends.

Thus, what is sought is apparatus for clearing and/or preventing accumulation of loose material on the housing or cover of a center knife drive of a sickle, including from areas not in close proximity to the path of movement of the driving lever or knife arm of the drive, and which overcomes one or more of the shortcomings and limitations, set forth above.

SUMMARY OF THE INVENTION

What is disclosed is apparatus for clearing and/or preventing accumulation of material on the housing or cover of a center knife drive of a sickle of a plant cutting machine, configured for clearing material from areas a substantial distance from the path of movement of the driving lever or knife arm of the drive, and which overcomes one or more of the shortcomings and limitations, set forth above.

According to a preferred aspect of the invention, the center knife drive has an upper cover bounded by a peripheral edge including a forward edge portion, an opposite rear edge portion, and opposite first and second side edge portions. The knife drive has at least one output element reciprocatingly movable by the drive sidewardly above the cover and connected to a knife of the sickle for moving it in a reciprocating cutting action, e.g., side to side relative to the guards. Importantly, the drive includes at least one cleaning flap in connection with the at least one output element for reciprocating movement thereby, disposed above a portion of the upper cover and configured for cleaning the loose material from the cover during the movement, particularly by pushing the loose material over the rear edge portion of the cover.

According to another preferred aspect of the invention, the drive includes two of the output elements, located adjacent the side edge portions of the cover, respectively, with cleaning flaps in connection therewith configured and operable for cleaning associated regions of the cover. The cleaning flaps are configured and positioned to converge and preferably overlap when in an initial position of their movement, over a forward region of the cover. In this position the flaps limit deposition of incoming material from the plant cutting process and forward movement of the machine onto the covered region of the cover. During initial portions of the movements of the operating cycle of the flaps they travel simultaneously toward the forward edge portion of the cover. This function is timed to occur when the output elements are moving in diverging sideward directions, that is, away from the center region, when less likely to be pushing material onto the cover.

As the output elements and associated knives reverse direction and move convergingly toward the center region of the cover, the flaps reverse direction also and begin to move more rearwardly, carrying and/or pushing loose material rearwardly with them. They now travel over a rear center region of the cover and move simultaneously toward the rear edge portion for additionally pushing loose material from that region of the cover over the rear edge portion, along with any material that falls from the flaps themselves. This latter function is preferably timed to occur when the output elements and knives are moving in converging sideward directions, that is, toward the center region and toward the ends of their strokes in that direction. And, further preferably, the flaps are configured so as to have portions located over side regions of the cover adjacent to the respective side edge portions, and to move toward those edges as the output elements are moved convergingly, for cleaning loose material from those regions simultaneously with the cleaning of the rear region of the cover. It should be noted that as these movements are occurring, the machine will be shaking and vibrating due to the travel over the ground and operation of the various systems and mechanisms of the machine, which will collectively facilitate the flow and removal of collected material from the tops of the flaps.

According to another preferred aspect of the invention, the drive is located below a floor of the plant cutting machine such that a space exists between the cover of the drive and the bottom surface of the floor, and the output element or elements, and the flaps, as well as the rear ends of knife arms connecting the output element or elements to a knife assembly or assemblies of the sickle, are located in the space. To accommodate this, the flaps are generally flat or vertically compact, and otherwise configured for movement within the space so as to keep it clear for movements of the output elements and knife arms, and to allow relative upward movement of the drive for operation in the sickle float mode and to accommodate a flexible sickle cutter bar. In a preferred embodiment, the forward region of the space is constrained, such that forward movements of the cleaning flaps within the space can result in essentially shoveling of material present onto the flaps, so as to then be carried rearwardly thereby and disposal thereof during subsequent rearward movements of the flaps.

DETAILED DESCRIPTION OF THE INVENTION

Turning now to the drawings wherein a preferred embodiment of the invention is shown, in FIGS. 1 through 5, a conventional, well known agricultural cutting machine, which is a combine 20, is shown including a header 22. Header 22 is shown supported in the conventional, well-known manner on a forward end 24 of combine 20, and is operable for cutting or severing crops such as, but not limited to, small grains such as wheat and soybeans, and inducting the severed crops into a feeder 26 for conveyance into combine 20 for threshing and cleaning, in the well known manner, as combine 20 moves forwardly over a field.

Header 22 includes a pan or floor 28 which is supported in desired proximity to the surface of the field during the harvesting operation, and an elongate, sidewardly extending sickle 30 along a forward edge portion 32 of floor 28, sickle 30 being operable for severing the plants or crop for induction into header 22, as will be explained. Header 22 additionally includes an elongate, sidewardly extending reel 34 disposed above sickle 30 and rotatable in a direction for facilitating induction of the severed plant material or crops into header 22. Here, header 22 is configured as a draper type, having a system of elongate, flat, sidewardly moving draper belts 36 and 38 having upwardly facing surfaces disposed just rearwardly of forward edge portion 32, operable in cooperation with reel 34 for conveying the severed plant material or crops toward an inlet opening of feeder 26 for induction into combine 20, in the well-known manner.

Figure 1:
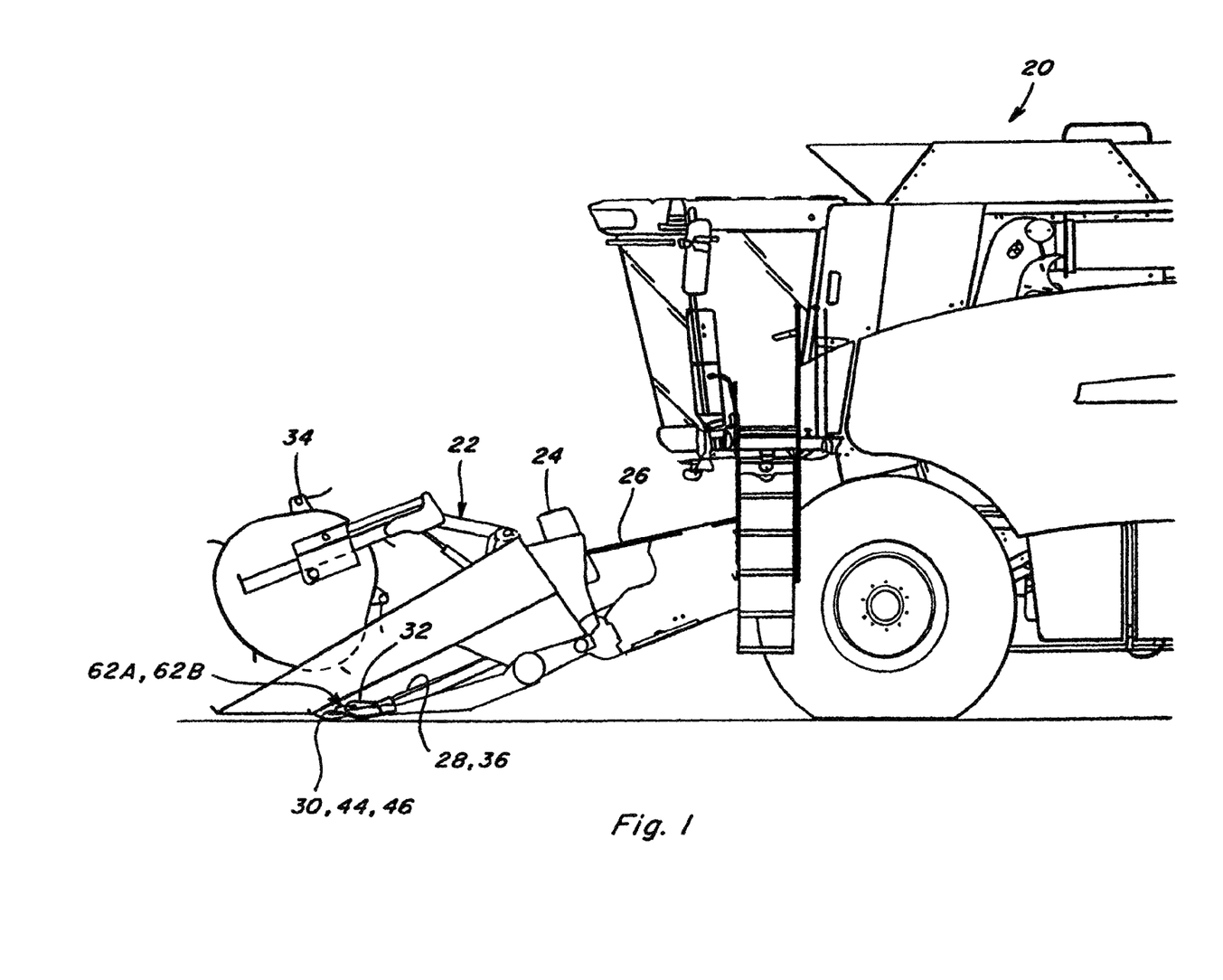
FIG. 1 is a fragmentary side view of a harvester including a header having center knife drive according to the invention.
Figure 2:
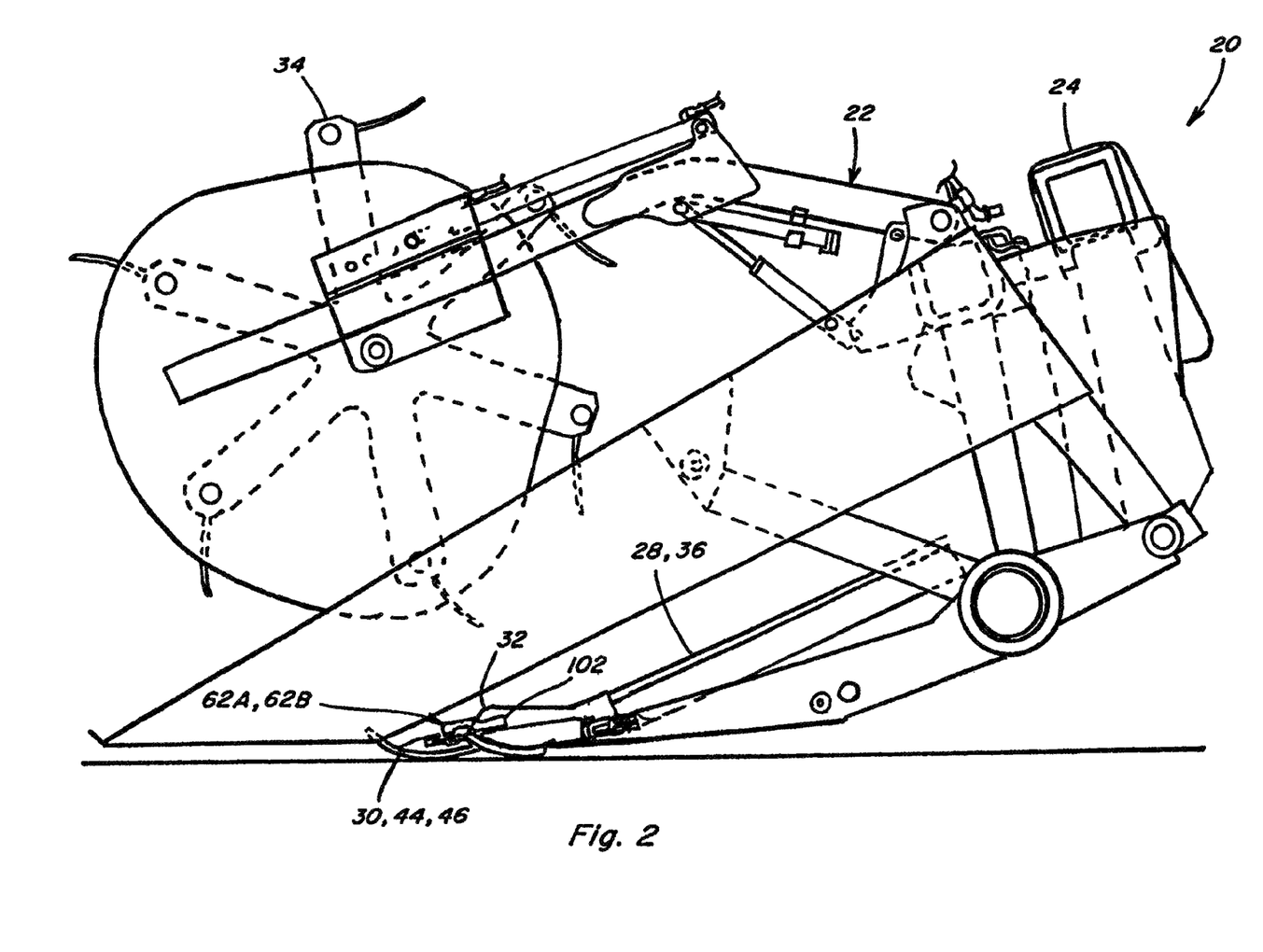
FIG. 2 is an enlarged fragmentary side view of the header and aspects of the center knife drive of the invention.
Figure 3:
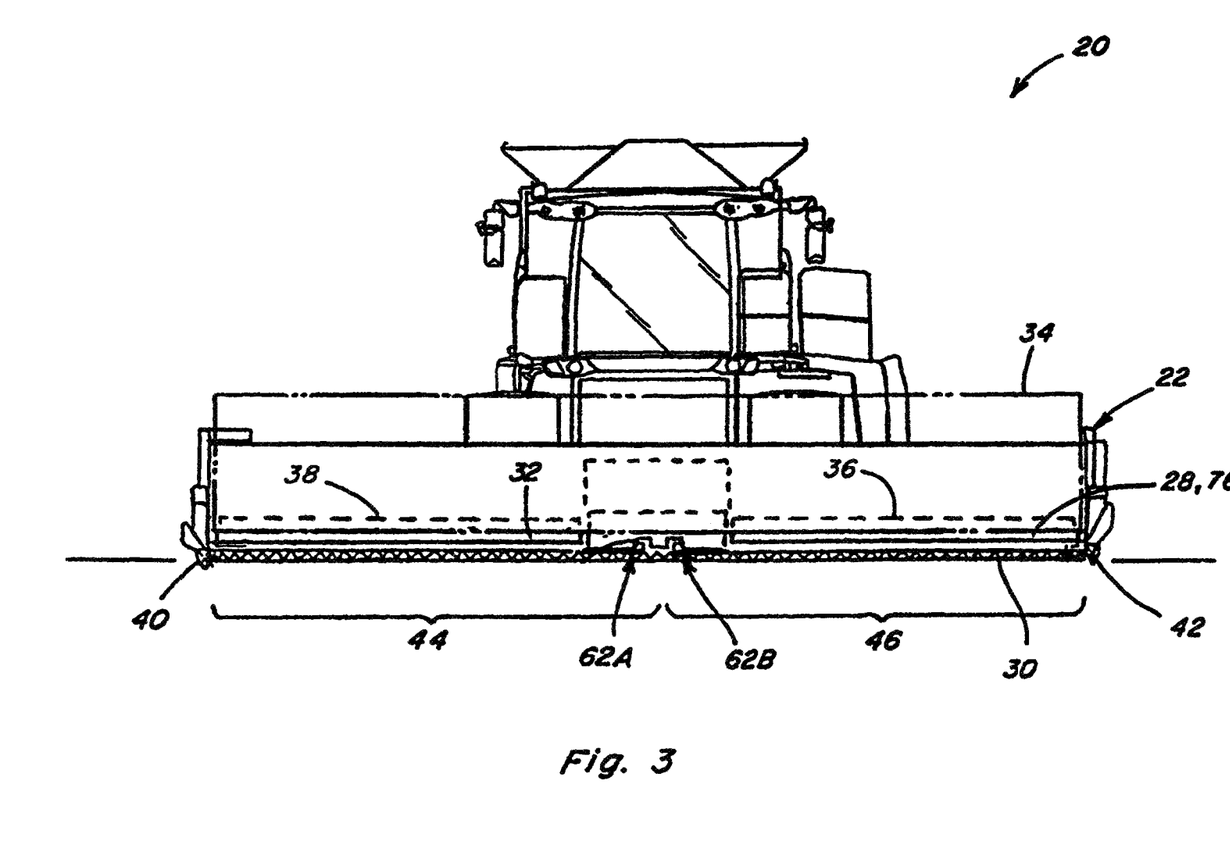
FIG. 3 is a front view of the harvester and header, showing the location of the center knife drive.

Referring more particularly to FIG. 3, sickle 30 extends in a sideward direction along the width of floor 28, between a first side edge portion 40 of the floor, and an opposite second side edge portion 42. Sickle 30 includes an elongate, sidewardly extending first cutter bar assembly 44, and an elongate, sidewardly extending second cutter bar assembly 46 extending in end to end relation to cutter bar assembly 44, cutter bar assemblies 44 and 46 being supported in substantially longitudinally aligned relation adjacent to forward edge portion 32 of floor 28.

Figure 4:
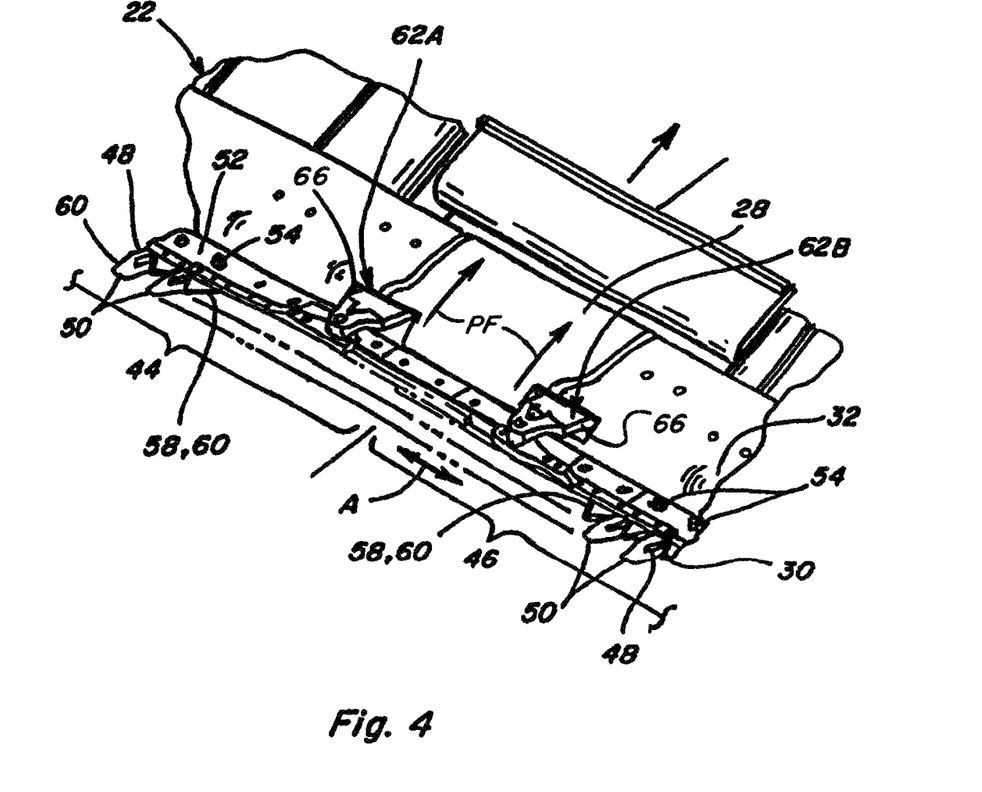
FIG. 4 is a fragmentary perspective view of the header, showing aspects of the center knife drive.
Figure 5:
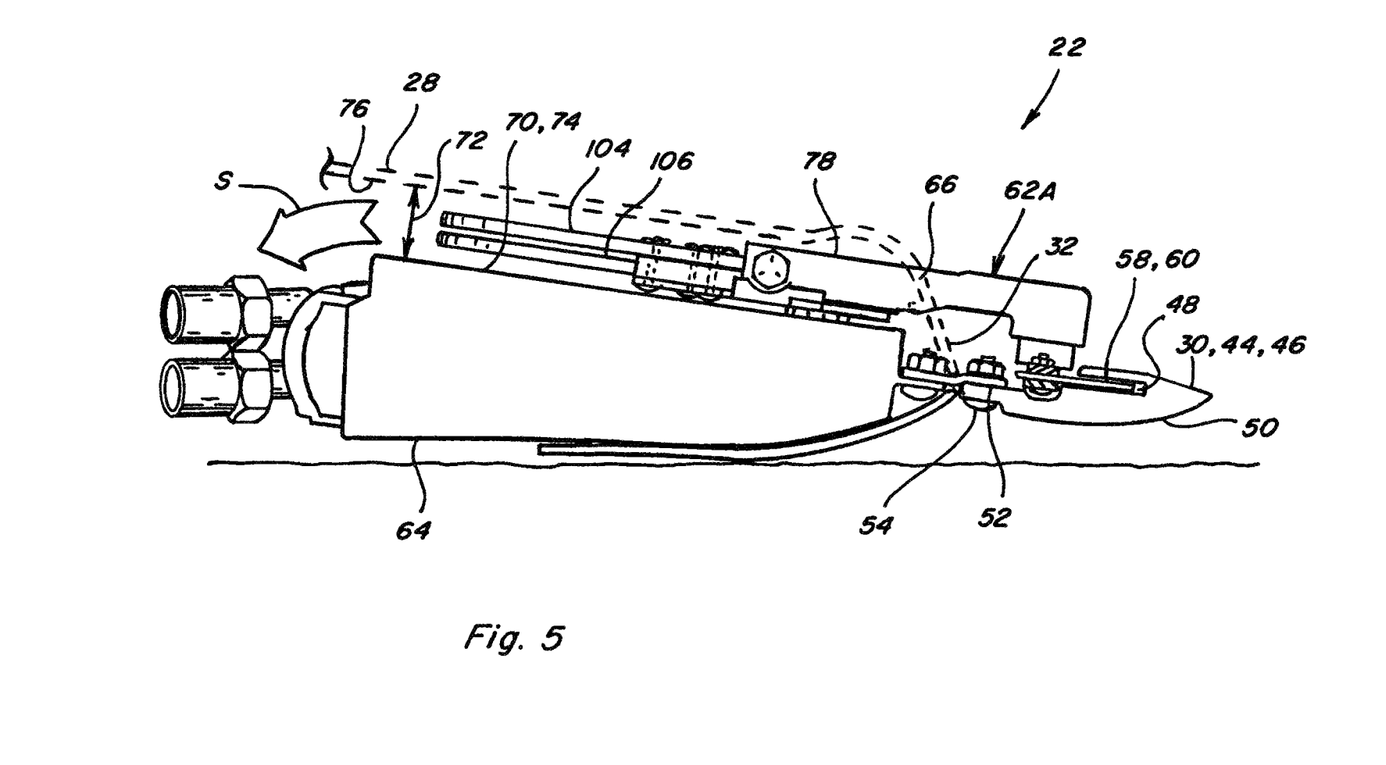
FIG. 5 is an enlarged side view showing aspects of the header, center knife drive, and a cleaning flap of the drive.

Cutter bar assemblies 44 and 46 each include a plurality of sidewardly facing aligned slots 48 through a sidewardly extending array of guards 50 which project forwardly from a stationary bar 52 at sidewardly spaced intervals therealong. Stationary bar 52 extends the length of sickle 30 just forwardly of forward edge portion 32 of floor 28, and guards 50 are mounted to bar 52 with fasteners 54. Bar 52, in turn, is mounted to a frame 56 of header 22 adjacent to forward edge portion 32 by fasteners 54, as best illustrated in FIG. 5. Each of cutter bar assemblies 44 and 46 supports an elongate knife assembly 58 for reciprocating longitudinal movement within slots 48, each knife assembly 58 having a row of knife sections 60 including oppositely facing, angularly related knife edges which, in conjunction with adjacent guards 50, effects a shearing or cutting action which severs plant stems and stalks or other material captured between the knives and the guards as the knife sections are reciprocatingly moved sidewardly, as denoted by arrow A in FIG. 4.

Referring also to FIGS. 6 through 12, knife assemblies 58 are reciprocatingly driven by first and second knife arms 62A and 62B of a center knife drive 64. Knife arms 62A and 62B are illustrated in FIGS. 3 and 4 at a center location on header 22 equidistant between side edge portions 40 and 42 at the opposite ends of the header, although it should be noted that it is contemplated that center knife drive 64 could alternatively be utilized at other locations on a header, and that multiple drives 64 could be used at multiple locations on a header. Center knife drive 64 is preferably located completely within or beneath floor 28 as best shown in FIG. 5, to reduce interruption of flow of cut plant material thereover and thereabout. Center knife drive 64 can comprise a variety of vertically compact mechanisms to facilitate the location in or under floor 28, such as, but not limited to, low profile or compact epicyclical, crank, and pivoting type apparatus operable to impart a reciprocating sideward motion, or pivoting sideward motion, to the knife assemblies denoted by arrow A. The disclosures and teachings of Cook et al. PCT patent applications Serial Nos. PCT/US12/39739 and PCT/US12/39749, both filed May 25, 2012, are hereby incorporated by reference herein in its entirety, as representative non-limiting examples of low profile drive mechanisms that can be utilized with the present invention for achieving the desired cutting action.

Knife arms 62A and 62B project forwardly through openings 66 (FIGS. 4 and 5) in or in the vicinity of forward edge portion 32 of floor 28, for connection to the respective knife assemblies 58, and which are moved in a side to side reciprocating motion by drive 64, for effecting the cutting action A. As is evident from the location of knife arms 62A and 62B and openings 66, they will be located directly in the path of the rearward flow of cut plant material over forward edge 32, as denoted by arrows PF in FIG. 4 and onto the upper surface of floor 28 during plant cutting operations. As a result, some loose plant material or residue, including grain, as well as dust, dirt and other material, can be expected to enter openings 66. This can be problematic and undesirable, as drive 64 is at least partially contained under an upper cover 70, on which the material can collect or accumulate, as denoted by material M in FIG. 7. This is undesired for several reasons, including as discussed above, that the material can insulate upper cover 70 so as to prevent dissipation of the heat so as to possibly result in damage to the internal mechanism and components of the drive. Also, if sickle 30 is configured to operate in a float mode wherein cutter bar assemblies 44 and 46 are allowed to float upwardly and downwardly relative to floor 28 as denoted by arrow B in FIGS. 6 and 7, or are flexible, for providing a ground following capability for cutting crops such as soybeans close to the ground G, accumulated material M can obstruct, limit, and/or prevent full upward movement of the cutter bar within the desired range.

In this regard, a space 72 will exist between an upper surface 74 of cover 70 and a bottom surface 76 of floor 28 to accommodate optional upward movements of the drive. In the configuration shown, at least rear portions of knife arms 62A and 62B located below the floor are disposed above cover 70 in space 72. Here, the knife arms are connected to first and second output elements 78 and 80, respectively, of drive 64, which are also located in space 72, for reciprocating sideward movement therewith. More particularly, each output element 78, 80 includes a shaft 82 extending upwardly through cover 70 and a splined element 84 mounted about the upper end of the shaft, e.g. by a clamping action or the like. Shaft 82 is rotatably driven by drive 64 in a reciprocating rotating manner, as denoted by arrows R, to effect limited sideward reciprocating movements of splined elements 84 and thus knife arms 62A and 62B, which effect the side to side reciprocating movements A of the knife assemblies 58 as explained above.

Figure 6:
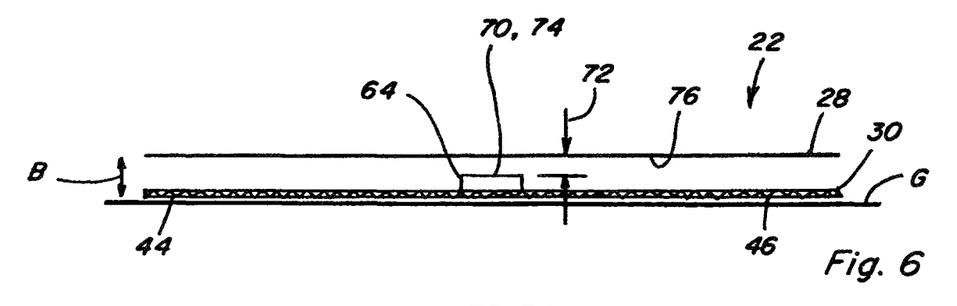
FIG. 6 is a simplified schematic front view of the header, sickle and center knife drive illustrating a space between the drive and a floor of the header to accommodate upward movements of the drive and sickle.
Figure 7:
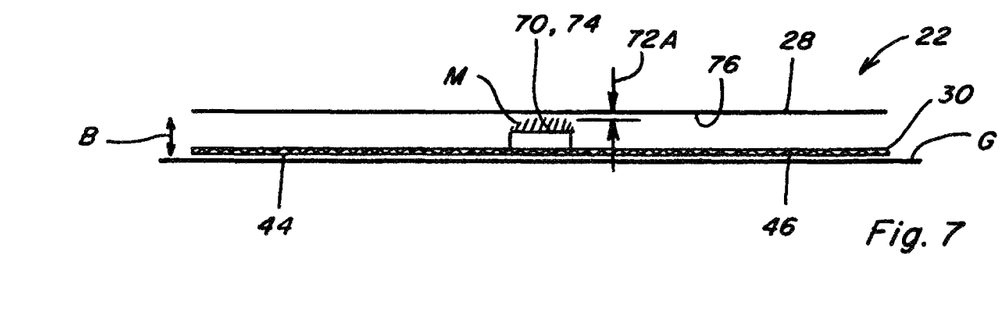
FIG. 7 is another simplified schematic front view of the header, sickle and drive illustrating a build up of material on the drive that can limit the range of upward movement of the drive and sickle.
Figure 8:
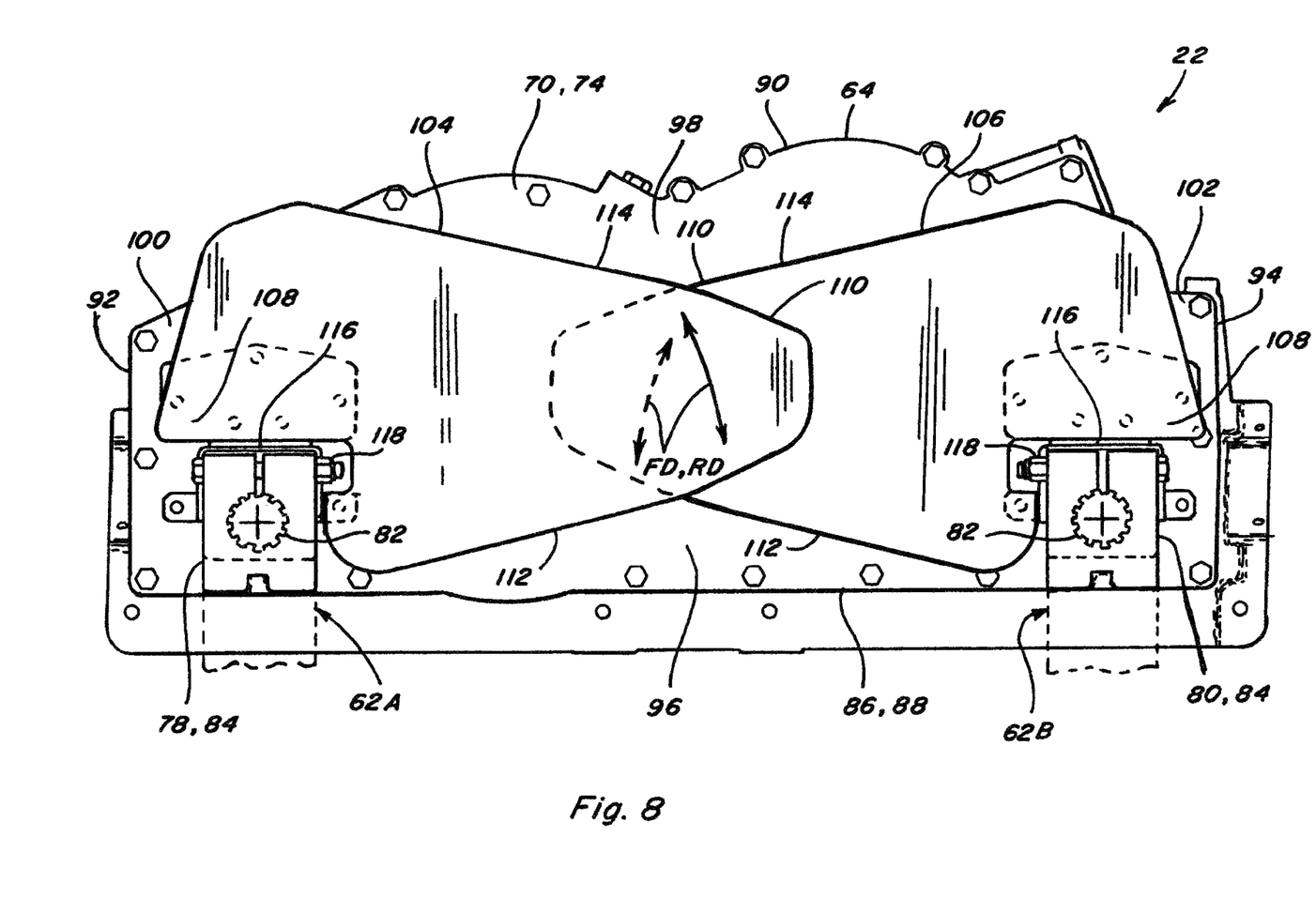
FIG. 8 is top view of the header through the floor to show the center knife drive, with the cleaning flaps in a middle position.
Figure 9:
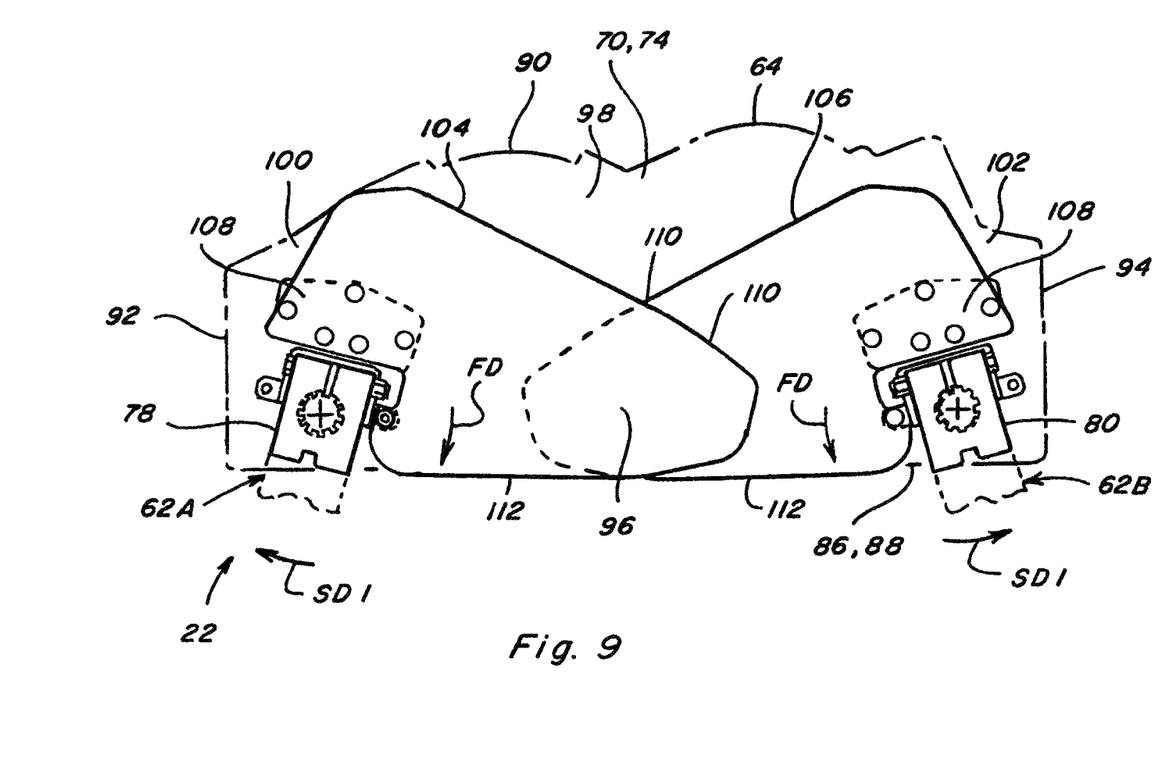
FIG. 9 is another top view of the header through the floor to show the drive, with the flaps in a forward position.
Figure 10:
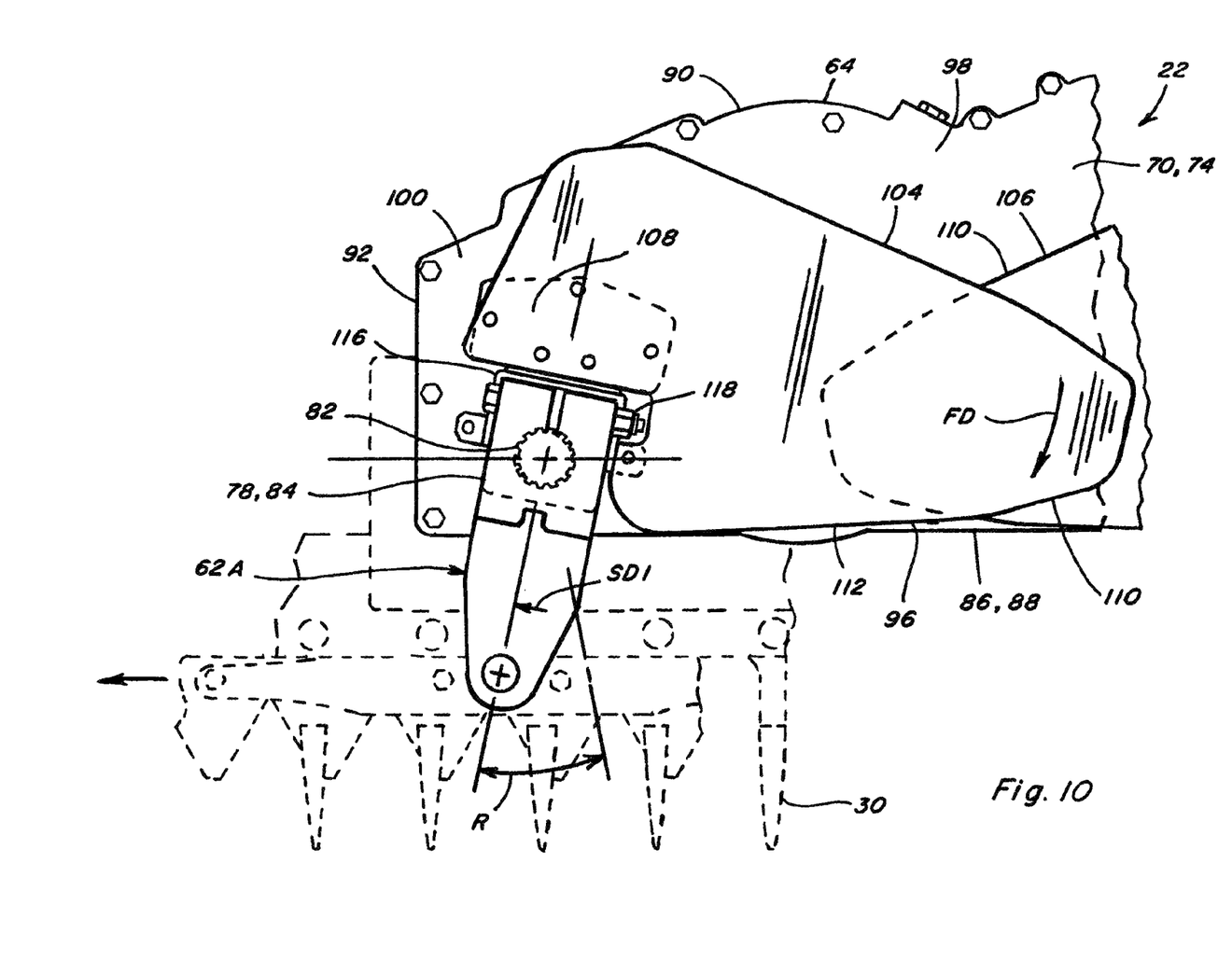
FIG. 10 is an enlarged fragmentary sectional top view of the header through the floor to show the center knife drive with the flaps in the forward position and showing aspects of the sickle.
Figure 11:
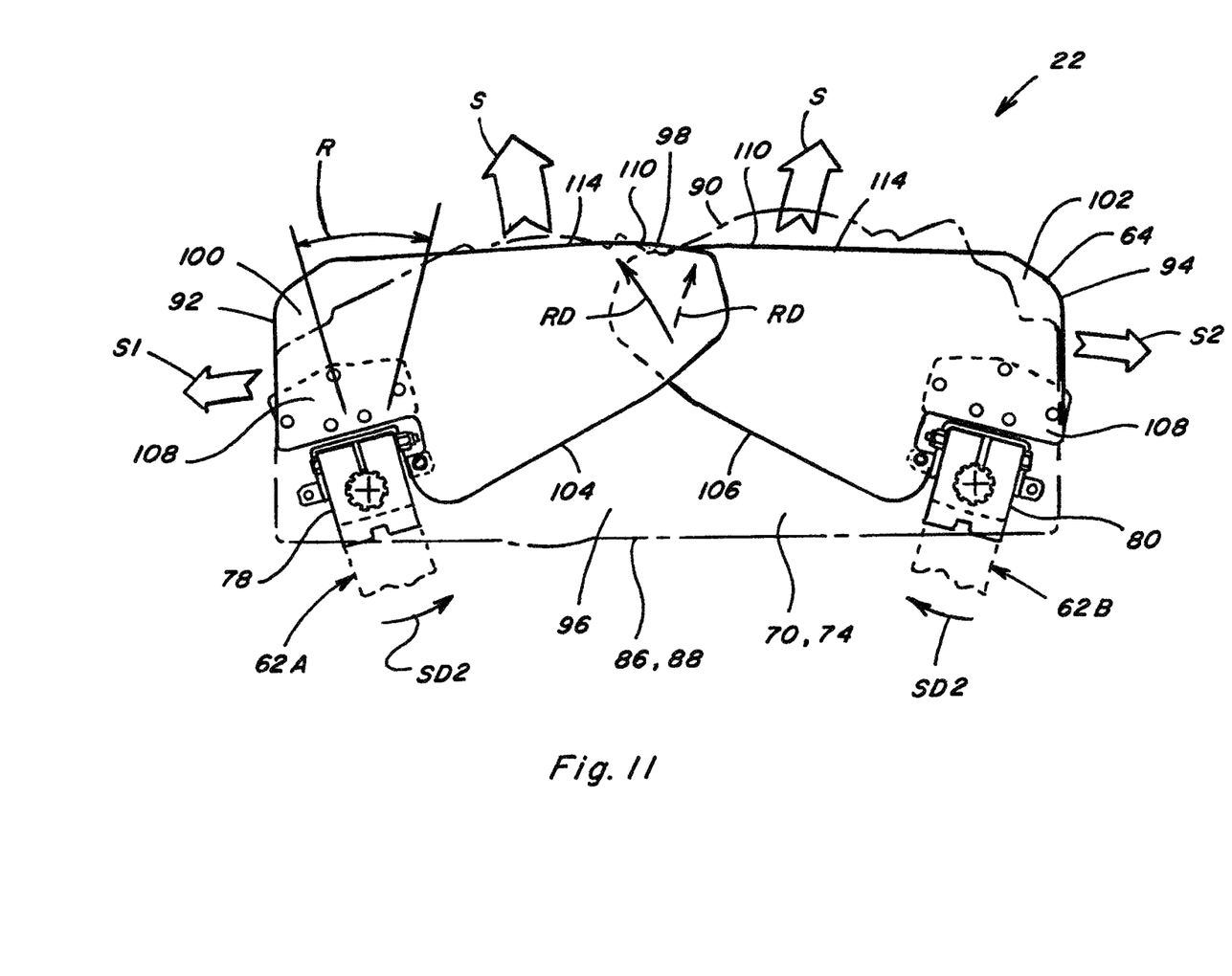
FIG. 11 is a simplified schematic top view of the header through the floor to show the drive, with the flaps in a rearward position.
Figure 12:
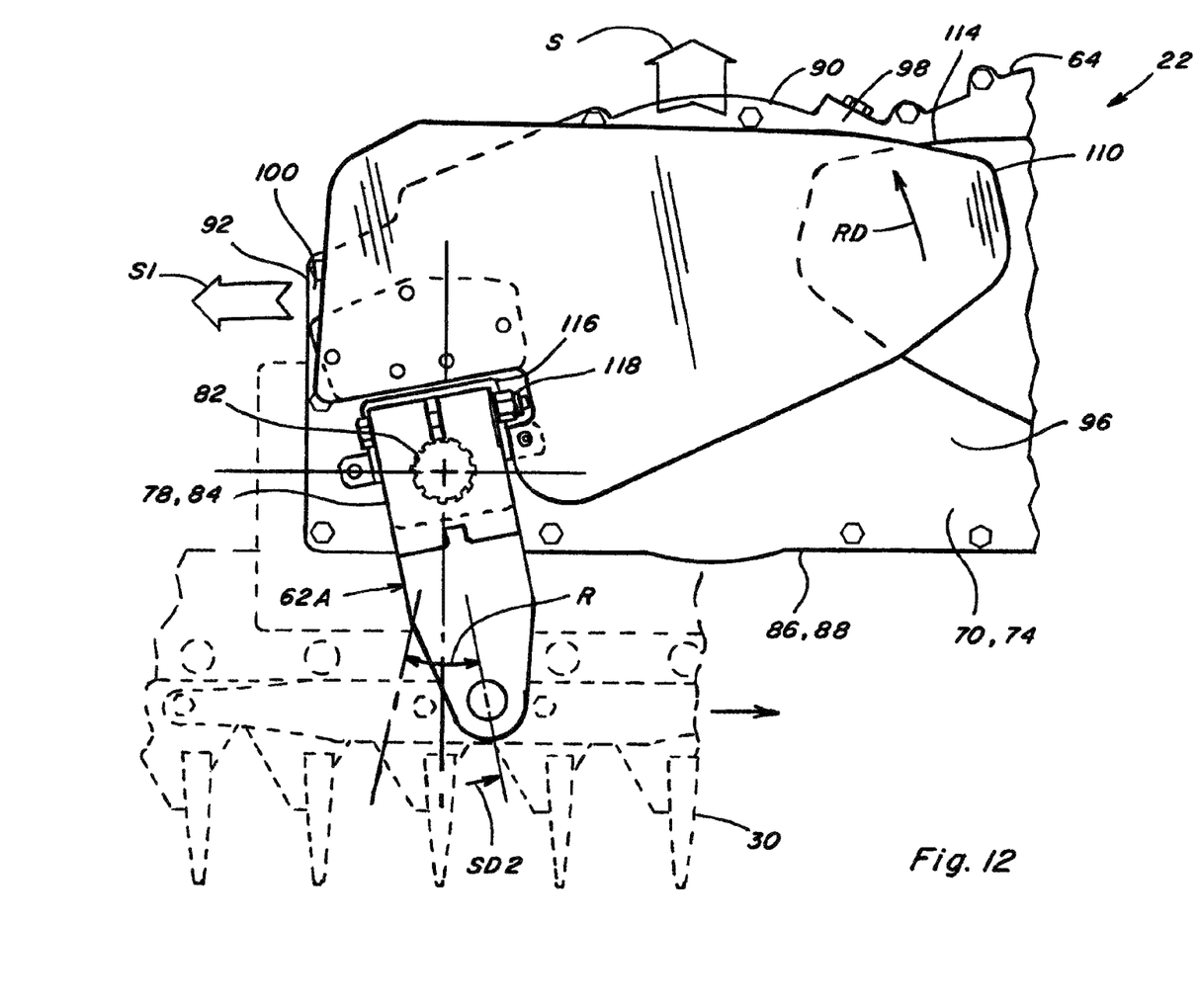
FIG. 12 is another enlarged fragmentary sectional top view of the header through the floor to show the center knife drive, showing the flaps in the rearward position and showing aspects of the sickle.

As best illustrated in FIGS. 6 and 7, for a sickle operating in the float mode, or a flexible sickle, the height of space 72 will vary as a function of the vertical position of the sickle or cutter bar relative to the floor, which will be a function of the distance B. If allowed to build up in space 72, crop residue and other material M can become compacted and of sufficient quantity and firmness to impede or prevent a full range of upward movement of the sickle or cutter bar as illustrated by the different heights 72 and 72A in FIGS. 6 and 7. This can be problematic as it can result in absence of triggering of the header float or height control system when high ground or mounds are encountered, such that the cutter bar is undesirably held in a lowered position and will essentially plow or drag over the ground and possibly be damaged or otherwise operate in an unintended or undesirable manner. Also, in the instance of a flexible sickle or cutter bar, the upward flexibility and travel can be similarly impeded or prevented. Still further, if the unwanted material is allowed to accumulate to a large extent, it can interfere with the reciprocating movements of splined elements 84 and knife arms 62A and 62B resulting in increased load on and wear of those components as well as the associated driving mechanisms and components of drive 64.

Referring more particularly to FIGS. 9 through 12, cover 70 of drive 64 is bounded by a peripheral edge 86 thereabout, including a forward edge portion 88, an opposite rear edge portion 90, and opposite first and second side edge portions 92 and 94. In the embodiment illustrated, output elements 78 and 80 are located beside side edge portions 92 and 94, respectively, although it should be understood that other locations can be used without limiting the invention. This results in a large area of surface 74 of cover 70 disposed between the knife arms 62A and 62B, denoted as a forward center region 96 adjacent to and bounded by forward edge portion 88. Cover 70 has a rear center region 98 at least partially rearwardly of output elements 78 and 80 adjacent to and bounded by rear edge portion 90, and smaller first and second side regions 100 and 102 just rearwardly of output elements 78 and 80, located adjacent to side edge portions 92 and 94, respectively. It is desired to maintain at least those portions of the cover to be traversed by knife arms 62A and 62B at least largely clean of free of accumulated loose material, and the other regions as well, to prevent or limit heat build up, compacting and hardening of accumulated material, and the other problems discussed above.

To clean and limit build of loose material on cover 70, drive 64 includes first and second cleaning flaps 104 and 106 constructed and operable according to the teachings of the present invention, in connection with output elements 78 and 80, and thus knife arms 62A and 62B, for reciprocating movement therewith. Cleaning flaps 104 and 106 are configured and disposed above cover 70 for cleaning loose material from the cover, generally by gathering or sweeping the material and pushing it over an edge of the cover during the reciprocating movements of the output elements, as denoted by large arrow S in FIGS. 5 and 12. In particular, flaps 104 and 106 preferably have a generally flat shape so as to be movable within space 72, and are sufficiently long so as to span at least about one half the width of cover 70. Here, the flaps generally align with forward edge portion 88 of the cover (FIGS. 9 and 10) when in their forwardmost position, and also overlap in this position so as to have sufficient length and reach for covering and cleaning the more rearward region of the cover when in more rearward positions.

Structurally, each cleaning flap 104 and 106 has a mounting end 108 connected about the associated splined element 84, here by attachment using a U-shape bracket 116 which is fastened about element 84 with a fastener 118 which also clamps splined element 84 to shaft 82, although it is contemplated that other manners of attachment could additionally or alternatively be used without limiting the invention. Each flap has a free end 110, and opposite front and rear edges 112 and 114 extending from mounting end 108 to the free end in generally converging relation. Flaps 104 and 106 are connected to output elements 78 and 80 so as to be timed to extend convergingly and overlappingly over forward center region 96 when the output elements are approaching or are at the outermost ends of their paths of sideward movement in a first direction denoted by arrows SD1, that is, when the output elements are at their greatest angular distance from center region 96. As the output elements are approaching this position, flaps 104 and 106 will be moving more forwardly as denoted by arrow FD, and will cover the center region along front edge 112 until reversal of the direction of movement of the output elements so as to move in the direction denoted by arrow SD2. Here, it can be observed that the forward end of space 72 is at least largely closed, and thus some loose material may be forced against the underside forward regions of floor 28 by this movement so as to essentially be shoveled or forced onto the upper surface of one or both of the flaps for removal during reverse movements of the flaps.

When output elements 78 and 88 reverse direction and are simultaneously moving in second sideward direction SD2, flaps 104 and 106 will be simultaneously moving more rearwardly over rear center region 98, as denoted by arrows RD, and will gather any loose material along rear edges 114 of the flaps and push it over rear edge portion 90 of the cover until the output elements reach the endpoint of travel in sideward direction SD2 and again reverse direction. Any material carried on the flaps can also fall from therefrom, at least partly as a result of environmental vibrations and bumps resulting from travel over rough terrain and the like and from operation of the various systems of the machine. It can be observed that the area rearward of drive 64 is open to the ground, which allows the material to fall from the bottom of the header. Here, it can be noted that flaps 104 and 106 each include a smaller end edge 118 angularly related to rear edge 114, that moves more in alignment with the associated output element (and the associated knife arm also) and these edges will push loose material from side regions 100 and 102 off of side edge portions 92 and 94 respectively, as denoted by arrows SD1 and SD2, so as to also fall onto the ground.

The above described sequence of cleaning movements will be repeated throughout the duration of movement of the output elements and associated knife arms. In this way, it can be observed that at least much of the loose material that enters space 72 through openings 66 will be removed from the space between the output elements and knife arms with largely rearward movements of the flaps, during the diverging and converging sideward movements of the knife arms, for cleaning essentially the entire upper surface 74 of cover 70, to prevent or reduce conditions that can result in heat related failure of the drive, and limitations on the upward movements of the drive during a float mode and when a flexible cutter bar is employed, and also side to side movements of the output elements and knife arms.

Figure 13:
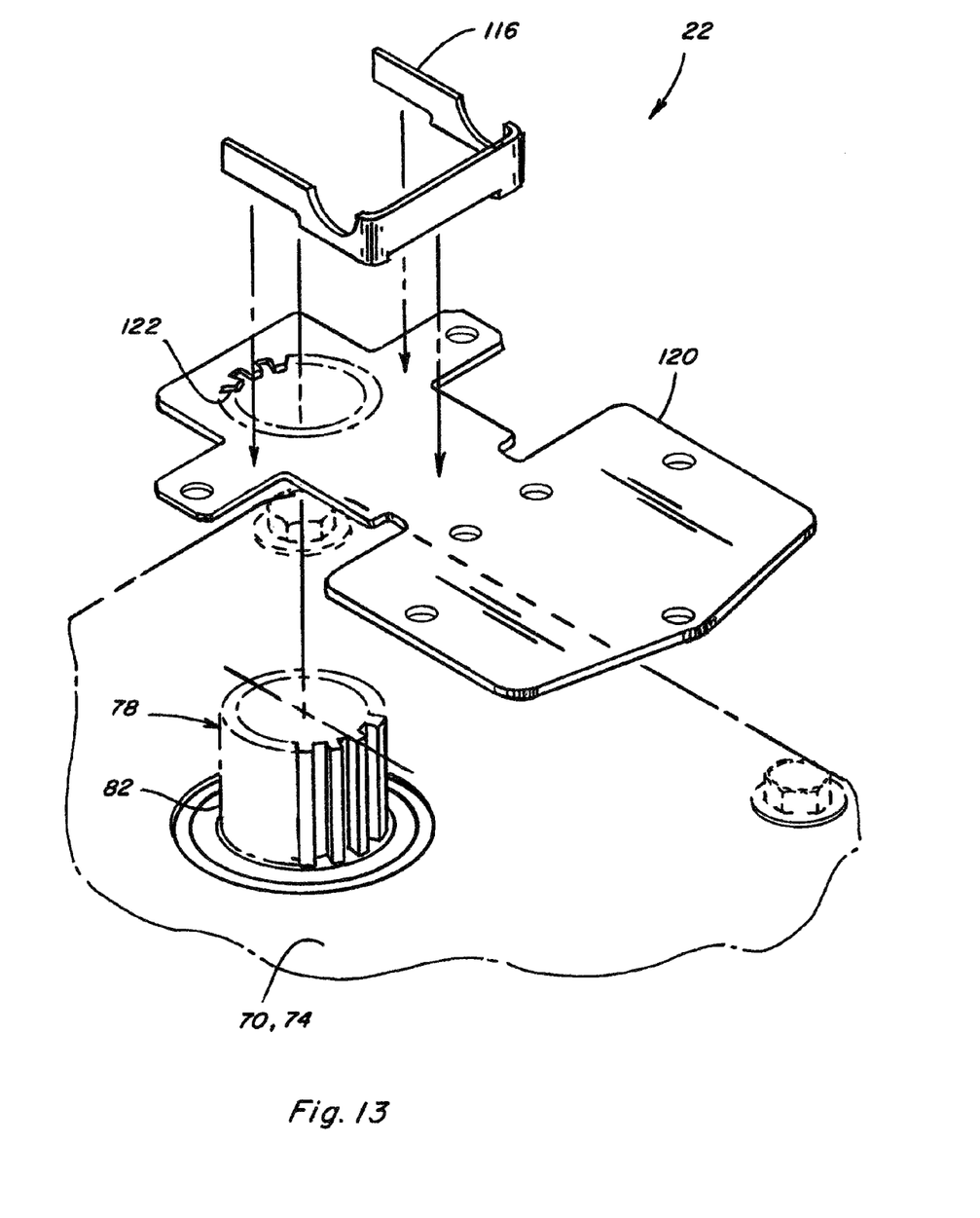
FIG. 13 is an enlarged fragmentary perspective view of the drive showing aspects of representative apparatus for connecting a cleaning flap to an output element of the drive.

Referring more particularly to FIG. 13, the cleaning flaps will attach to brackets 116 is a convenient manner, here by welding or other attachment of brackets 116 to a plate 120 that is attached to the respective flap by suitable fasteners such as rivets or screws, by welding, or the like. Plate 120 preferably includes a splined hole 122 which matingly receives the associated splined element 84 for rotation with the associated output element, although it should be understood that it is contemplated that a wide variety of different connections could be used with equal utility.

In light of all the foregoing, it should thus be apparent to those skilled in the art that there has been shown and described a novel cleaning flap arrangement for a center knife drive of a sickle of a plant cutting machine. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A center knife drive for a sickle of a plant cutting machine, comprising:
   an upper cover bounded by a peripheral edge including a forward edge portion, a rear edge portion opposite the forward edge portion, and opposite first and second side edge portions extending between the forward edge portion and the rear edge portion;
   at least two output elements, each reciprocatingly movable sidewardly above the upper cover for moving a respective knife of the sickle in a reciprocating cutting action, the at least two output elements located adjacent to the first and second side edge portions of the upper cover respectively; and
   at least two cleaning flaps, each connected to a respective one of the at least two output elements for movement with the respective one of the at least two output elements generally forwardly and rearwardly, each of the at least two cleaning flaps disposed above a portion of the upper cover and configured to clean the upper cover during the movement by carrying and pushing loose material rearwardly over the rear edge portion of the upper cover, the at least two cleaning flaps being positioned and shaped so as to extend in overlapping relation over a region of the upper cover during at least a portion of the movements with the at least two output elements.

2. The center knife drive of claim 1, wherein the at least two cleaning flaps extend in overlapping relation generally over a center forward region of the upper cover during a first portion of the movements with the at least two output elements.

3. The center knife drive of claim 1, wherein the at least two cleaning flaps are positioned and shaped so as to extend in overlapping relation generally over a center rear region of the upper cover and to move toward the rear edge portion of the upper cover during a second portion of the movements with the at least two output elements for pushing material that has accumulated on and above the center rear region over the rear edge portion.

4. The center knife drive of claim 3, wherein the at least two cleaning flaps are positioned and shaped so as to be located above opposite first and second side regions of the upper cover adjacent to the first and second side edge portions of the upper cover, respectively, during an initial portion of the second portion of the movements, and movable toward the opposite first and second side edge portions during a subsequent portion of the second portion of the movements, for pushing material that has accumulated on and above the opposite first and second side regions, over the opposite first and second side edge portions of the upper cover.

5. The center knife drive of claim 3, wherein the first portion of the movements comprises sidewardly diverging movements of the at least two output elements and the second portion of the movements comprises sidewardly converging movements of the at least two output elements.

6. The center knife drive of claim 1, wherein each of the at least two output elements comprises an upstanding shaft pivotally movable about an axis therethrough, a splined element disposed about the shaft configured for connecting a knife arm to the shaft for pivotal movement therewith, and wherein each of the at least two cleaning flaps is connected about the splined element of the shaft of a respective one of the at least two output elements.

7. The center knife drive of claim 1, wherein the drive is configured to be located beneath a floor of the plant cutting machine, the drive further comprising at least two knife arms configured to be located at least partially within a space between the upper cover of the drive and the floor and configured for extending forwardly through an opening in the floor, wherein the at least two cleaning flaps are configured and positioned so as to be moved forwardly by respective ones of the at least two output elements during a portion of the movements thereof, for pushing loose material that has passed through the opening and into the space over the rear edge portion of the upper cover to prevent accumulation of the loose material in the space above the upper cover.

8. A center knife drive for a sickle of a plant cutting machine, comprising:
   a generally flat upper cover bounded by a peripheral edge including a forward edge portion, an opposite rear edge portion, and opposite first and second side edge portions extending therebetween;
   first and second output elements reciprocatingly sidewardly movable by the drive, extending upwardly from the cover adjacent to the first and second side edge portions, respectively, connected to knife assemblies of the sickle for reciprocatingly moving the knife assemblies in timed, sideward reciprocating cutting actions, respectively; and
   first and second cleaning flaps in connection with the first and second output elements, respectively, so as to extend sidewardly over a center region of the cover and so as to be moved generally forwardly and rearwardly by the output elements for cleaning loose material from the cover.

9. The center knife drive of claim 8, wherein the output elements and the cleaning flaps are configured and operable such that the cleaning flaps will be simultaneously moved forwardly by the movements of the output elements in diverging sideward directions, respectively, for cooperatively covering the center region of the cover.

10. The center knife drive of claim 8, wherein the output elements and the cleaning flaps are configured and operable such that at least portions of the flaps will be simultaneously moved rearwardly by the sideward movements of the output elements in converging sideward directions, respectively, for pushing material that has accumulated on the center region over the rear edge portion of the cover.

11. The center knife drive of claim 10, wherein portions of the cleaning flaps are configured and positioned so as to also push material over the side edge portions of the cover by the converging movements of the output elements.

12. The center knife drive of claim 8, wherein each of the cleaning flaps has a generally flat, elongate shape.

13. The center knife drive of claim 8, wherein the drive is located beneath a floor of the plant cutting machine and the output elements include knife arms which extend forwardly through at least one opening in the floor to connections with the knife assemblies, respectively, for reciprocatingly moving the knife assemblies in the timed, sideward reciprocating cutting actions, and the cleaning flaps are configured and positioned within a space between the cover and the floor so as to be moved forwardly within the space by the output elements during a portion of the sideward movements thereof for covering at least a substantial portion of a center forward region of the cover.

14. A center knife drive for a sickle of a plant cutting machine, comprising:
   an upper cover bounded by a peripheral edge including a forward edge portion, an opposite rear edge portion, and opposite first and second side edge portions;

at least two output elements, each configured for reciprocating sideward movement above the upper cover by moving a respective knife of the sickle in a reciprocating cutting action, the at least two output elements disposed adjacent to the opposite first and second side edge portions of the upper cover;

a cleaning flap in connection with each of the at least two output elements for reciprocating generally forward and rearward movement during the sideward movements, of the at least two output elements, the cleaning flap of each of the at least two output elements disposed above a portion of the upper cover and configured for cleaning the upper cover during the sideward movements by pushing loose material over at least the rear edge portion of the upper cover, the cleaning flap of each of the at least two output elements configured so as to overlap over a region of the upper cover during at least a portion of the reciprocating generally forward and rearward movements.

15. The center knife drive of claim 14, wherein a portion of the cleaning flap in connection with each of the at least two output elements is configured so as to push material over a respective one of the opposite first and second side edge portions of the upper cover during at least a portion of the reciprocating generally forward and rearward movements.

16. The center knife drive of claim 14, wherein the cleaning flaps in connection with the at least two output elements are configured so as to overlap over a forward center region of the upper cover when in a forward position of movement thereover.

17. The center knife drive of claim 14, wherein the at least two output elements and the cleaning flaps in connection with the at least two output elements are configured and operable such that the cleaning flaps will be simultaneously moved forwardly by portions of the sideward movements of the at least two output elements.

18. The center knife drive of claim 14, wherein the at least two output elements and the cleaning flaps in connection with the at least two output elements are configured and operable such that the cleaning flaps will be simultaneously moved rearwardly by other portions of the sideward movements of the at last two output elements, for cooperatively pushing the material over the rearward edge portion of the upper cover.

19. The center knife drive of claim 14, wherein the reciprocating sideward movements of the at least two output elements comprise pivoting or rotating movements.

20. The center knife drive of claim 14, wherein the drive is configured to be located beneath a floor of the plant cutting machine and the at least two output elements each include a knife arm extending forwardly through an opening in the floor to a respective connection with the knife, for reciprocatingly moving the knife in the cutting action, and the cleaning flap in connection with each of the at least two output elements is configured and positioned within a space between the upper cover and the floor so as to be moved generally rearwardly within the space by a respective one of the at least two output elements during a portion of the sideward movement thereof for cleaning the material from the space.

* * * * *